(12) United States Patent
Krishna et al.

(10) Patent No.: US 10,956,735 B1
(45) Date of Patent: Mar. 23, 2021

(54) SYSTEM AND METHOD FOR DETERMINING A REFRACTIVE ERROR FROM RED REFLEX IMAGES OF EYES

(71) Applicants: Vrishab Krishna, Bangalore (IN); Viswesh Krishna, Bangalore (IN)

(72) Inventors: Vrishab Krishna, Bangalore (IN); Viswesh Krishna, Bangalore (IN)

(*) Notice: Subject to any disclaimer, the term of this patent is extended or adjusted under 35 U.S.C. 154(b) by 0 days.

(21) Appl. No.: 17/075,585

(22) Filed: Oct. 20, 2020

(51) Int. Cl.
*G06K 9/00* (2006.01)
*G06K 9/62* (2006.01)
*G06T 5/00* (2006.01)
*G06T 5/40* (2006.01)

(52) U.S. Cl.
CPC ....... *G06K 9/00604* (2013.01); *G06K 9/0061* (2013.01); *G06K 9/00248* (2013.01); *G06K 9/6223* (2013.01); *G06T 5/002* (2013.01); *G06T 5/003* (2013.01); *G06T 5/009* (2013.01); *G06T 5/40* (2013.01); *G06T 2207/30201* (2013.01)

(58) Field of Classification Search
CPC ............. G06K 9/00604; G06K 9/6223; G06K 9/0061; G06K 9/00248; G06T 5/009; G06T 5/40; G06T 5/003; G06T 5/002; G06T 2207/30201
See application file for complete search history.

(56) References Cited

U.S. PATENT DOCUMENTS

| | | | |
|---|---|---|---|
| 2016/0320837 A1* | 11/2016 | Swedish | G06K 9/00604 |
| 2020/0054209 A1* | 2/2020 | Zhang | G06T 7/10 |
| 2020/0327304 A1* | 10/2020 | Li | G06K 9/00617 |

* cited by examiner

*Primary Examiner* — Phuoc Tran

(57) ABSTRACT

A system for determining a refractive error from a red reflex image of the eyes of a subject by analyzing the red reflex image of the subject using deep learning and clustering algorithms is provided. The system (i) predicts a probability map for each of sixteen eye landmarks on a contour of an iris of the eye, (ii) determines a location of an eye landmark on the eye-region image, (iii) determines a circular mask of the iris, (iv) extracts an iris region image between the circular mask of the iris and the eye-region image, (v) generates a plurality of clusters by identifying a similarity between pixels of the iris region image, (vi) determines a crescent of the red reflex in the iris, (viii) predicts a pupil radius, (ix) determines a width of the crescent, and (x) determines a power in each eye by computing a width of an anti-crescent, eccentricity of an image capturing device, a working distance of the image capturing device.

19 Claims, 5 Drawing Sheets

SYSTEM AND METHOD FOR DETERMINING A REFRACTIVE ERROR FROM RED REFLEX IMAGES OF EYES

BACKGROUND

Technical Field

The embodiments herein generally relate to determining a refractive error of the eyes of a subject, and more specifically to a system and method for determining a refractive error from a red reflex image of the eyes of a subject by analyzing the red reflex image of the subject using deep learning and clustering algorithms.

Description of the Related Art

Optometry is directed towards improving vision, detecting abnormalities, and treating various eye diseases. Myopia and hyperopia are optical imperfections that occur in the eyes and these conditions are commonly detected through examination of an eye specialist such as an Optician, Optometrist or Ophthalmologist. The examination is performed based on the pupillary red reflex test, which is carried out by passing a light through the eyes. The light reaches the transparent retina and is reflected back out of the pupil. The reflected light may be obtained as a red reflex which depends upon the blood and the amount of pigment in the overlying layer of the retina called choroid that nourishes the retina.

Generally, opticians use photorefraction devices to examine the red reflex associated with the eyes to detect optical imperfect conditions. These instruments have a higher degree of complexity and they need sophisticated arrangements. Hence as an alternative, small hand-held ophthalmoscopes are being used by Ophthalmologist which are very costly and stands as a limiting factor to treat patients who are economically backward especially in developing nations. Also, rural populations have a very limited access to such facilities due to economic factors and timely detection of eye defects and subsequent treatment remains a great challenge for them. Though existing approaches provide methods to measure optical imperfections using photorefraction techniques by integration with portable devices, the image processing with these methods was not very effective and are they capable of calculating only aberrations associated with the eyes.

Further, the high refractive error is the most common form of visual impairment in the world with around 2 billion people are suffering from it. Conventional solution uses autorefractors, which are bulky and expensive machines, for predicting the refractive error in the eyes. These are used in the diagnostic capacity in an ophthalmologist clinic, but also, used for screening in rural and developing areas. However, these machines are difficult to use at scale due to their cost and inefficiency. Due to these common issues with the conventional approach, photoscreening systems are used. However, such systems involve the analysis of images of the eye in different lighting conditions. Many of these systems require training to operate and are expensive.

Existing solution uses a photoscreening system that uses red reflex images from a smartphone for determining the refractive error. In the photoscreening system, it infers the relationship between the crescent width and power, using a fixed working distance for all measurements along with the restriction that the face must be present in a mask. However, the photoscreening system does not provide any details as to how it segments the red reflex and extracts the Accordingly, there remains a need for an inexpensive, accurate, efficient, and automated system and method for determining a refractive error in the eyes of a subject.

SUMMARY

In view of the foregoing, an embodiment herein provides a method of determining a refractive error from a red reflex image of the eyes of a subject by analyzing the red reflex image of the subject using deep learning and clustering algorithms. The method includes the steps of: (i) generating a database with a facial image associated with a subject, wherein the facial image is captured using an image capturing device; (ii) predicting a probability map for each of sixteen eye landmarks on a contour of an iris of the eye by processing each eye-region image using a convolutional pose machine; (iii) automatically determining a location of an eye landmark on the eye-region image as a location of a peak of the corresponding probability map; (iv) determining a circular mask of the iris, using a circular regression technique, by computing a circle of radius and a center for the sixteen eye landmarks from its respective location; (v) extracting an iris region image between the circular mask of the iris and the eye-region image using a bitwise algorithm; (vi) generating a plurality of clusters, using a spectral clustering technique, by identifying a similarity between pixels of the iris region image; (vii) determining a crescent of the red reflex in the iris by extracting a crescent mask using the plurality of clusters and selecting clusters that are closer to a center of the iris region image with a least boundary overlap with the iris, for measuring a refractive error; (viii) automatically predicting a pupil radius by measuring a mean distance between an outer contour of the crescent mask and a center of the iris; (ix) automatically determining a width of the crescent, using a Newton's/Euler's Method, using an area of the crescent and the pupil radius; and (x) automatically determining a power in each eye by computing a width of an anti-crescent, eccentricity of the image capturing device, a working distance of the image capturing device.

In some embodiments, the facial image is captured using an image capturing device. In some embodiments, the image capturing device may be a smartphone, a digital camera, or a colour scanner.

In some embodiments, each eye-region image is extracted by (i) redacting the facial image by predicting a plurality of facial landmarks from the facial image; and (ii) extracting the eye region images from the redacted image by slicing the redacted image using the plurality of facial landmarks. In some embodiments, the eye region images comprise a left eye-region image and a right eye-region image.

In some embodiments, the method further includes the steps of generating a similarity matrix between every pair of the pixels of the iris region image based on the identified similarity between the pixels of the iris region image for generating the plurality of clusters using the spectral clustering technique.

In some embodiments, the width of the anti-crescent is computed by subtracting the width of the crescent from the pupil diameter.

In some embodiments, the plurality of facial landmarks is detected using a facial landmark detection technique. In some embodiments, the facial landmark detection technique comprises a machine learning model to identify frontal human faces in the facial image and estimates their pose with 50 to 200 landmarks on the face of the subject.

In some embodiments, the facial landmark detection technique comprises at least one of the Histogram of Ordered Gradients (HOG) feature combining with a linear classifier algorithm, an image pyramid technique, or a sliding window detection technique.

In some embodiments, the convolutional pose machine implements an ensemble of regression trees model, using the facial landmark detection technique, to predict a position of a plurality of facial landmarks on the facial image of the subject including points on the eyelid and canthi. In some embodiments, the plurality of facial landmarks are predicted using the ensemble of regression trees model all over the face and the facial landmarks around the nose bridge, eyebrows and eyes are used to anonymize the facial image.

In some embodiments, the positions of the facial landmarks are indexed from 37-42 for the right eye and 43-48 for the left eye to identify the eyes from the facial image of the subject.

In some embodiments, the eccentricity of the image capturing device is defined to be a distance between the nearest edge of a camera lens and a center of the flash in the image capturing device.

In some embodiments, the working distance is estimated using the iris and its width as a marker which is scaled by a ratio dependent on the resolution of the image capturing device.

In some embodiments, the facial image of the subject is preprocessed for noise removal, contrast improvements, and blur detection.

In some embodiments, the noise removal of the facial image is performed by smoothing the facial image using Gaussian blurring.

In some embodiments, the contrast improvements of the facial image include applying a gamma correction with a suitable value depending on the average pixel value.

In some embodiments, the blur detection in the facial image is performed using a variance of the Laplacian of Gaussian (LoG) operation.

In one aspect, one or more non-transitory computer-readable storage mediums storing instructions, which when executed by a processor, performs a method for automatically determining a refractive error from a red reflex image of the eyes of a subject by analyzing the red reflex image of the subject using deep learning and clustering algorithms is provided. The method includes steps of: (i) generating a database with a facial image associated with a subject, wherein the facial image is captured using an image capturing device; (ii) predicting a probability map for each of sixteen eye landmarks on a contour of an iris of the eye by processing each eye-region image using a convolutional pose machine; (iii) automatically determining a location of an eye landmark on the eye-region image as a location of a peak of the corresponding probability map; (iv) determining a circular mask of the iris, using a circular regression technique, by computing a circle of radius and a center for the sixteen eye landmarks from its respective location; (v) extracting an iris region image between the circular mask of the iris and the eye-region image using a bitwise algorithm; (vi) generating a plurality of clusters, using a spectral clustering technique, by identifying a similarity between pixels of the iris region image; (vii) determining a crescent of the red reflex in the iris by extracting a crescent mask using the plurality of clusters and selecting clusters that are closer to a center of the iris region image with a least boundary overlap with the iris, for measuring a refractive error; (viii) automatically predicting a pupil radius by measuring a mean distance between an outer contour of the crescent mask and a center of the iris; (ix) automatically determining a width of the crescent, using a Newton's/Euler's Method, using an area of the crescent and the pupil radius; and (x) automatically determining a power in each eye by computing a width of an anti-crescent, eccentricity of the image capturing device, a working distance of the image capturing device.

In some embodiments, the facial image is captured using an image capturing device. In some embodiments, the image capturing device may be a smartphone, a digital camera, or a colour scanner.

In some embodiments, each eye-region image is extracted by (i) redacting the facial image by predicting a plurality of facial landmarks from the facial image; and (ii) extracting the eye region images from the redacted image by slicing the redacted image using the plurality of facial landmarks. In some embodiments, the eye region images comprise a left eye-region image and a right eye-region imager.

In some embodiments, the method further includes the steps of generating a similarity matrix between every pair of the pixels of the iris region image based on the identified similarity between the pixels of the iris region image for generating the plurality of clusters using the spectral clustering technique.

In another aspect, a system for determining a refractive error from a red reflex image of the eyes of a subject by analyzing the red reflex image of the subject using deep learning and clustering algorithms is provided. The system includes a memory and a device processor. The memory includes a database that stores facial images associated with the subject. The facial image is captured using an image capturing device. The database stores one or more modules executed by the device processor. The set of modules includes (i) a database generation module that generates a database with facial images associated with a subject, wherein the facial image is captured using an image capturing device; (ii) a probability map prediction module that predicts a probability map for each of sixteen eye landmarks on a contour of an iris of the eye by processing each eye-region image using a convolutional pose machine; (iii) an eye landmark location determination module that determines a location of an eye landmark on the eye-region image as a location of a peak of the corresponding probability map; (iv) a circular mask determination module that determines a circular mask of the iris, using a circular regression technique, by computing a circle of radius and a center for the sixteen eye landmarks from its respective location; (v) an iris region extraction module that extracts an iris region image using a bitwise algorithm between the circular mask of the iris and the eye-region image; (vi) a cluster generation module that generates a plurality of clusters, using a spectral clustering technique, by identifying a similarity between pixels of the iris region image; (vii) a crescent determination module that determines a crescent of the red reflex in the iris by extracting a crescent mask using the plurality of clusters and selecting clusters that are closer to a center of the iris region image with a least boundary overlap with the iris, for measuring a refractive error; (viii) a pupil prediction module that predicts a pupil radius by measuring a mean distance between an outer contour of the crescent mask and a center of the iris; (ix) a crescent width determination module that determines a width of the crescent, using a Newton's/Euler's Method, using an area of the crescent and the pupil radius; and (x) a power determination module that determines a power in each eye by computing a width of an anti-crescent, eccentricity of the image capturing device, a working distance of the image capturing device.

In some embodiments, the system extracts each eye-region image by (i) redacting the facial image by predicting a plurality of facial landmarks from the facial image; and (ii) extracting the eye region images from the redacted image by slicing the redacted image using the plurality of facial landmarks. In some embodiments, the eye region images comprise a left eye-region image and a right eye-region image.

In some embodiments, the cluster generation module (212) generates the similarity matrix between every pair of pixels of the iris region image based on the identified similarity between the pixels of the iris region image for generating the plurality of clusters using the spectral clustering technique.

In some embodiments, the width of the anti-crescent is computed by subtracting the width of the crescent from the pupil diameter.

In some embodiments, the system provides a simple non-invasive system to estimate the power in the subject using a photograph from a smartphone taken by untrained personnel. In some embodiments, the system is simple, fast, and accessible for calculating the refractive error in the subject. In some embodiments, the use of smartphone ensures an economical solution which is accessible and may be used in rural areas on a large scale for determining the refractive error in people.

In some embodiments, the system uses the convolutional pose machine and circular regression techniques for the segmentation of the iris regions. In some embodiments, the system identifies a similarity between pixels in the red reflex images, which is effective for determining the power of eyes. In some embodiments, the morphological processing of the crescent mask ensures accurate extraction of the crescent of the red reflex in the iris.

In some embodiments, the system uses various algorithms such as spectral clustering, DB-Scan, K-Means, Agglomerative Clustering, Spectral Clustering with Quadtree Decomposition, etc. for determining the power in the eyes of the subject. In some embodiments, the similarity between the pixels of the iris region image is defined based on other colorspaces such as HSV, CMYK, which are used to define alternate similarity functions. In some embodiments, the spectral clustering technique is used for the crescent and red reflex segmentation to extract the red reflex and the crescent mask and its shape from the iris region. In some embodiments, the anti-crescent width and the shape of the crescent are used for estimating the power of the eyes of the subject.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE DRAWINGS

Figure 1:
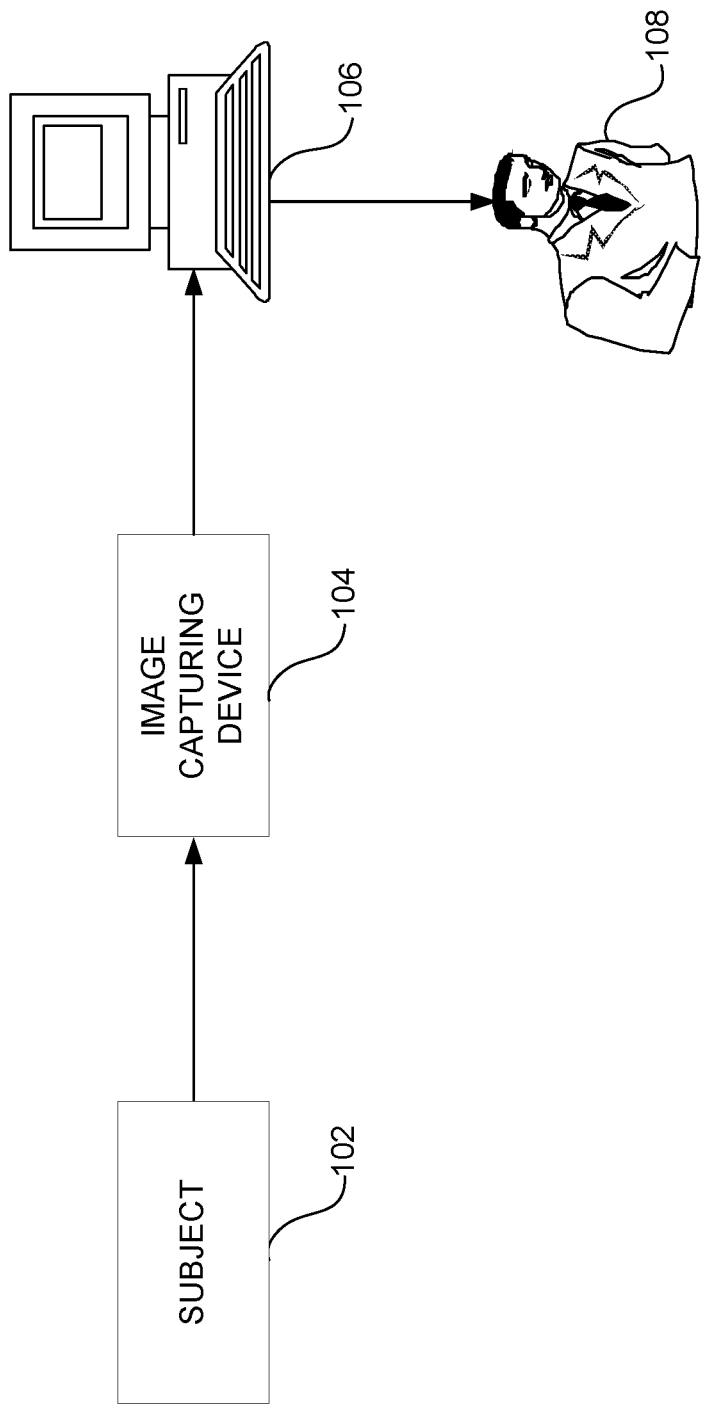
FIG. 1 illustrates a system view of a refractive error determination system that is interacting with an image capturing device for determining a refractive error from a red reflex image of the eyes of a subject according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide a system and a method for. Referring now to the drawings, and more particularly to FIGS. 1 through 4, where determining a refractive error from a red reflex image of the eyes of a subject by analyzing the red reflex image of the subject similar reference characters denote corresponding features consistently throughout the figures, preferred embodiments are shown.

FIG. 1 illustrates a system view of a refractive error determination system 106 that is interacting with an image capturing device 104 for determining a refractive error from a red reflex image of the eyes of a subject according to an embodiment herein. The system view includes the image capturing device 104 that is communicatively connected to the refractive error determination system 106. The image capturing device 104 captures a facial image of a subject 102. In some embodiments, the image capturing device 104 may be a smartphone or a camera phone. The refractive error determination system 106 determines a refractive error associated with the eyes of the subject 102 to a user 108 (e.g. a doctor, a physician, etc.). In some embodiments, the refractive error determination system 106 may be a mobile phone, a kindle, a PDA (Personal Digital Assistant), a tablet, a computer, an electronic notebook, or a smartphone. The refractive error determination system 106 includes a memory and a processor. When in operation, the image capturing device 104 captures one or more facial images of the subject 102 and communicates the facial images to the refractive error determination system 106 through a wired or wireless network. The refractive error determination system 106 generates a database of facial images associated with a subject 102. In some embodiments, the refractive error determination system 106 extracts each eye-region image by (i) redacting the facial image by predicting a plurality of facial landmarks from the facial image, and (ii) extracting the eye region images from the redacted image by slicing the redacted image using the plurality of facial landmarks. In some embodiments, the eye region images comprise a left eye-region image and a right eye-region image.

The refractive error determination system 106 predicts a probability map for each of sixteen eye landmarks on a contour of an iris of the eye by processing each eye-region image using a convolutional pose machine. The refractive error determination system 106 determines a location of an eye landmark on the eye-region image as a location of a peak of the corresponding probability map. The refractive error determination system 106 determines a circular mask of the iris, using a circular regression technique, by computing a circle of radius and a center for the sixteen eye landmarks from its respective location. The refractive error determination system 106 extracts an iris region image between the circular mask of the iris and the eye-region image using a bitwise algorithm. The refractive error determination system 106 generates a plurality of clusters, using a spectral clustering technique, by identifying a similarity between pixels of the iris region image. The refractive error determination system 106 determines a crescent of the red reflex in the iris by extracting a crescent mask using the plurality of clusters and selecting clusters that are closer to a center of the iris region image with a least boundary overlap with the iris, for measuring a refractive error. The refractive error determination system 106 predicts a pupil radius by measuring a mean distance between an outer contour of the crescent mask and a center of the iris. The refractive error determination system 106 determines a width of the crescent, using a Newton's/Euler's Method, using an area of the crescent and the pupil radius. The refractive error determination system 106 determines a power in each eye by computing a width of an anti-crescent, the eccentricity of the image capturing device, a working distance of the image capturing device.

In some embodiments, the refractive error determination system 106 generates a similarity matrix between every pair of the pixels of the iris region based on the identified similarity between the pixels of the iris region for generating the plurality of clusters using the spectral clustering technique. In some embodiments, the refractive error determination system 106 computes the width of the anti-crescent by subtracting the width of the crescent from the pupil diameter.

In some embodiments, the plurality of facial landmarks is detected using a facial landmark detection technique. In some embodiments, the facial landmark detection technique comprises at least one of the Histogram of Ordered Gradients (HOG) feature combining with a linear classifier algorithm, an image pyramid technique, or a sliding window detection technique.

Figure 2:
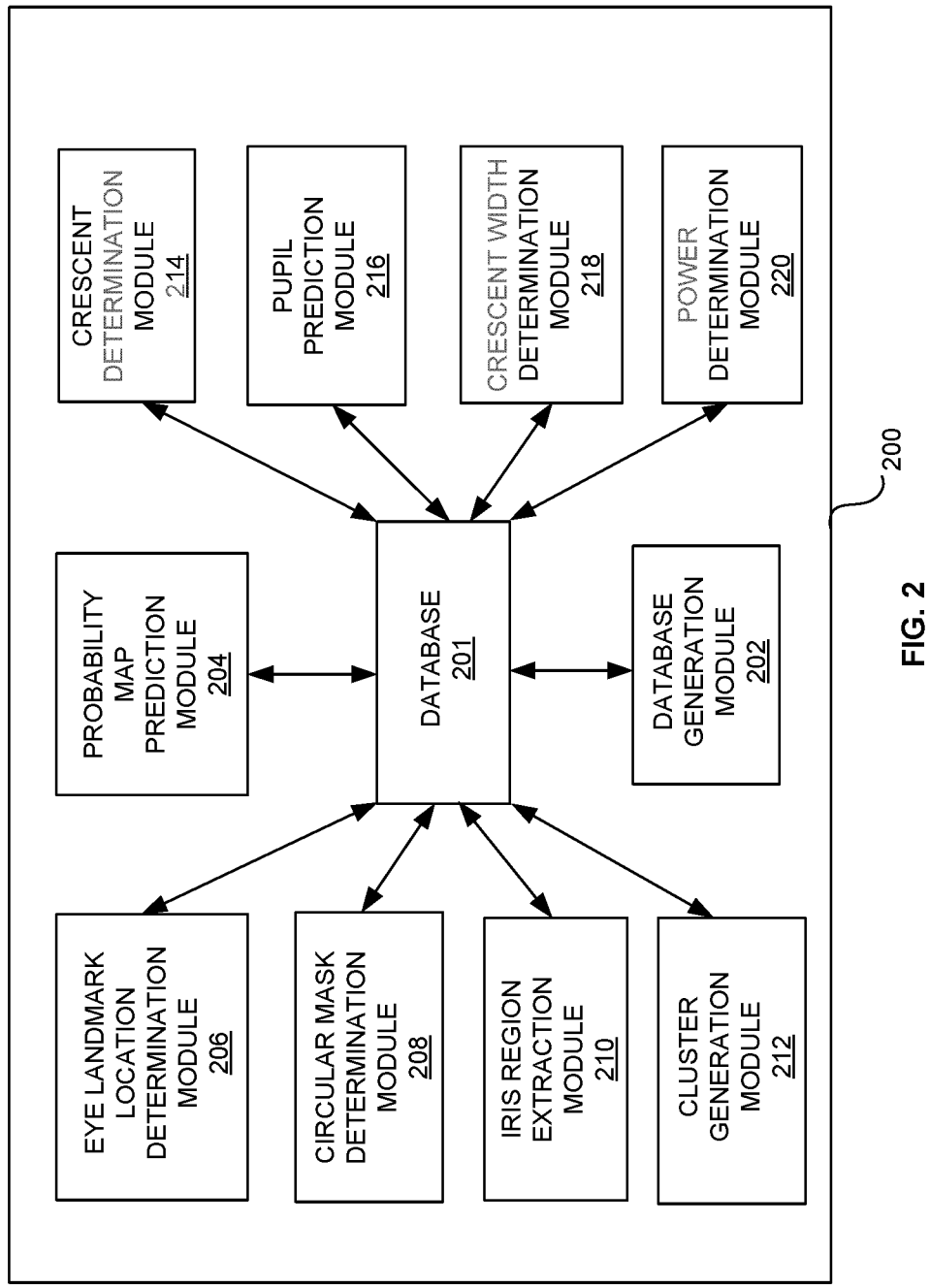
FIG. 2 is an exploded view of the refractive error determination system of FIG. 1 according to an embodiment herein.

FIG. 2 is an exploded view of the refractive error determination system 106 of FIG. 1 according to an embodiment herein. The refractive error determination system 106 includes a database 201, a database generation module 202, a probability map prediction module 204, an eye landmark location determination module 206, a circular mask determination module 208, an iris region extraction module 210, a cluster generation module 212, a crescent determination module 214, a pupil prediction module 216, a crescent width determination module 218 and a power determination module 220. The refractive error determination system 106 receives a facial image of the subject 102 to analyze the image containing the red reflex (or retinoscopic reflex) associated with the image. In some embodiments, the facial images are captured using an image capturing device 104. The facial images may be stored in the database 201. The database generation module 202 generates the database 201 with facial images associated with the subject 102. In some embodiments, the refractive error determination system 106 extracts each eye-region image by (i) redacting the facial image by predicting a plurality of facial landmarks from the facial image, and (ii) extracting the eye region images from the redacted image by slicing the redacted image using the plurality of facial landmarks. In some embodiments, the eye region images comprise a left eye-region image and a right eye-region image.

The probability map prediction module 204 predicts a probability map for each of sixteen eye landmarks on a contour of an iris of the eye by processing each eye-region image using a convolutional pose machine. The eye landmark location determination module 206 determines a location of an eye landmark on the eye-region image as a location of a peak of the corresponding probability map. The circular mask determination module 208 determines a circular mask of the iris, using a circular regression technique, by computing a circle of radius and a center for the sixteen eye landmarks from its respective location. The iris region extraction module 210 extracts an iris region image between the circular mask of the iris and the eye-region image using a bitwise algorithm. The cluster generation module 212 generates a plurality of clusters, using a spectral clustering technique, by identifying a similarity between pixels of the iris region image. The crescent determination module 214 determines a crescent of the red reflex in the iris by extracting a crescent mask using the plurality of clusters and selecting clusters that are closer to a center of the iris region image with a least boundary overlap with the iris, for measuring a refractive error. The pupil prediction module 216 predicts a pupil radius by measuring a mean distance between an outer contour of the crescent mask and a center of the iris. The crescent width determination module 218 determines a width of the crescent, using a Newton's/Euler's Method, using an area of the crescent and the pupil radius. The power determination module 220 determines a power in each eye by computing a width of an anti-crescent, the eccentricity of the image capturing device, a working distance of the image capturing device.

In some embodiments, the refractive error determination system 106 detects the plurality of facial landmarks using a facial landmark detection technique. In some embodiments, the facial landmark detection technique comprises a machine learning model to identify frontal human faces in the facial image and estimates their pose with 50 to 200 landmarks on the face of the subject. In some embodiments, the facial landmark detection technique comprises at least one of the Histogram of Ordered Gradients (HOG) feature combining with a linear classifier algorithm, an image pyramid technique, or sliding window detection technique.

In some embodiments, the probability map prediction module 204 employs the convolutional pose machine that implements an ensemble of regression trees model to predict a position of the plurality of facial landmarks on the facial image of the subject including points on the eyelid and canthi using the facial landmark detection technique. In some embodiments, the plurality of facial landmarks are predicted using the ensemble of regression trees model all over the face and the facial landmarks around the nose bridge, eyebrows and eyes are used to anonymize the facial image. In some embodiments, the positions of the facial landmarks are indexed from 37-42 for the right eye and 43-48 for the left eye to identify the eyes from the facial image of the subject.

In some embodiments, the circular mask determination module 208 determines a circular mask of the iris, using a circular regression model, by computing a circle of radius and a center for the sixteen eye landmarks from its respective location. In some embodiments, the circular mask of the iris is calculated, using the circular regression technique, as follows:

Where $x_i$ and $y_i$ refers to the location of one of the 16 eye landmarks in cartesian coordinates, where $c_x$ and $c_y$ refers to a predicted center of the circle, where r refers to a predicted radius of the circle, where A and b are matrices as used in the above calculation and prediction.

In some embodiments, the cluster generation module 212 generates a plurality of clusters, using a spectral clustering technique, by identifying a similarity between pixels of the iris region image. In some embodiments, the similarity $w_{ij}$ between pixels of the iris region image is defined as follows:

$$w_{ij} = \begin{cases} e^{-\|c_i - c_j\|^2 - \|r_i - r_j\|^2}, & \text{for } \|r_i - r_j\| \le r_{thresh} \\ 0, & \text{for } \|r_i - r_j\| > r_{thresh} \end{cases}$$

Where $c_i$ and $c_j$ refers to the color vector of the pixel (only the blue and green channels) while $r_i$ and $r_j$ refers to the location of the pixel in the image in cartesian coordinates. In some embodiments, a similarity matrix is generated between every pair of the pixels of the iris region based on the identified similarity between the pixels of the iris region for generating the plurality of clusters using the spectral clustering technique. The crescent determination module 214 determines a crescent of the red reflex in the iris by extracting a crescent mask that is closer to a center of the iris region image with a least boundary overlap with the iris, for measuring a refractive error.

In some embodiments, contours are extracted and those contours that are at a large distance (⅕ of the width or height) from any of the edges are eliminated while generating the mask for smaller crescent. In some embodiments, the angle at which the segment subtends at the center of the crescent is estimated using a Linear Approximation by the initial conditions:

$$a = \frac{2A}{r^2}$$

where A is the number of white pixels in the crescent mask and r is the radius of the pupil determined from the size of the crescent mask.

$\theta_0 = a$ and the recursive formula:

$$\theta_{n+1} = \theta_n + \frac{a - (\theta_n - \sin\theta_n)}{1 - \cos\theta_n}$$

The recurrence is calculated until the condition $a - (\theta_n - \sin(\theta_n)) \le 10^{-3}$ is true.

In some embodiments, from the final angle θ, the width of the anti-crescent, w, is described by the formula:

$w = r(1 + \cos\theta)$.

In some embodiments, the power determination module (220) measures the refractive error/power using the anti-crescent width, the eccentricity of the light source (the distance between the camera lens and the flash in a smartphone), the working distance (distance between the camera and the subject) and the diameter of the pupil.

In some embodiments, the eccentricity of the image capturing device is defined to be a distance between the nearest edge of the camera lens and a center of the flash in the image capturing device 104. In some embodiments, the working distance is estimated using the iris and its width as a marker which is scaled by a ratio dependent on the resolution of the image capturing device 104. In some embodiments, the power of the eye is calculated using the following formula:

$$P = \frac{e}{d}\left(\frac{1}{w} - \frac{1}{d_I}\right)$$

where e is the eccentricity of the image capturing device, w is the anti-crescent width and d is the working distance and $d_I$ is the diameter of the pupil. In some embodiments, the difference in power of the eyes (anisometropia), δ, is calculated by:

$$\delta = \frac{e}{d}\left(\frac{1}{w_1} - \frac{1}{w_2}\right)$$

where e is the eccentricity of the camera equipment, d is the working distance, $w_1$ is the anti-crescent width of the first eye, and $w_2$ is that of the second eye.

In some embodiments, the convolutional pose machine comprises a sequence of predictors trained to make dense predictions at a location of each image (e.g. the eye region image). In some embodiments, the convolutional pose machine comprises a sequence of convolutional networks that repeatedly produce 2D belief maps for the location of each part of the image. At each stage in the convolutional pose machine, image features and the belief/probability maps produced by the previous stage are used as input. The belief maps provide a subsequent stage, an expressive non-parametric encoding of the spatial uncertainty of location for each part, and allows the convolutional pose machine to learn rich image-dependent spatial models of the relationships between parts. In some embodiments, the convolutional pose machine provides a sequential prediction framework for learning rich implicit spatial models. In some embodiments, a systematic design of convolutional networks may be incorporated into the pose machine framework for learning image features and image-dependent spatial models for performing pose estimation.

In some embodiments, the spectral clustering technique uses the spectrum (eigenvalues) of the similarity matrix of the data to perform dimensionality reduction before clustering in fewer dimensions. In some embodiments, the similarity matrix is provided as an input and the similarity matrix comprises a quantitative assessment of the relative similarity of each pair of points (e.g. pixels of the iris region image) in the dataset.

In some embodiments, the circular iris mask is generated using a center and radius predictions of the circular regression technique over the iris contour landmarks using the convolutional pose machine. In some embodiments, the iris region image is extracted between the circular mask of the iris and the eye-region image using a bitwise algorithm. In some embodiment, the bitwise algorithms are used to perform operations at bit-level or to manipulate bits in different ways. The bitwise operations are found to be much faster and are some times used to improve the efficiency of a program. In some embodiments, the bitwise algorithm is a bitwise-AND operator. In some embodiments, the bitwise AND operator (&) compares each bit of the first operand to the corresponding bit of the second operand. If both bits are 1, the corresponding result bit is set to 1. Otherwise, the corresponding result bit is set to 0. Both operands to the bitwise AND operator must be of integral types.

In some embodiments, the facial landmark detection technique is applied to detect points of interest on the face using machine learning models. In some embodiments, the landmarks on the nose-bridge and near the eyebrows are used to redact the image by extracting only the eye regions and, thus, anonymize the image and protect the privacy of the subject.

In some embodiments, the machine learning model comprises a machine learning technique that is designed to recognize and interpret the data through a machine perception, labeling, and by clustering the raw data. In some embodiments, the machine learning model is trained to interpret the raw data by providing a collection of data as an input. In some embodiments, the machine learning model is trained to perform the task with the processor.

In some embodiments, the refractive error determination system 106 preprocess the facial image of the subject for noise removal, contrast improvements, and blur detection. In some embodiments, the noise removal of the facial image is performed by smoothing the facial image using Gaussian blurring. In some embodiments, the contrast improvements of the facial image include applying a gamma correction with a suitable value depending on the average pixel value. In some embodiments, the blur detection in the facial image is performed using a variance of the Laplacian of Gaussian (LoG) operation.

Figure 3A:
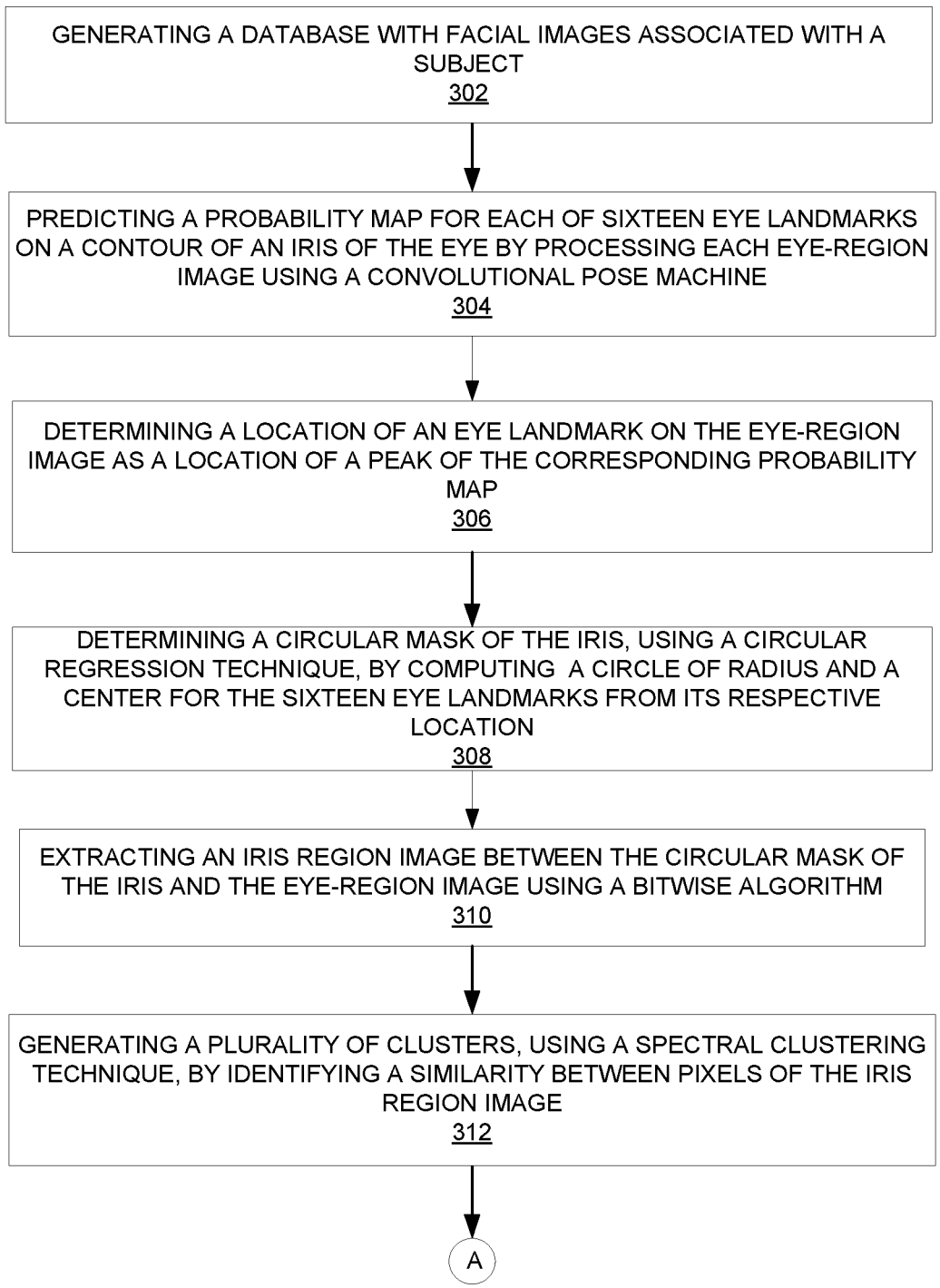
FIG. 3A and FIG. 3B are flow diagrams that illustrate a method for determining a refractive error from a red reflex image of the eyes of a subject by analyzing the red reflex image of the subject using the refractive error determination system of FIG. 1 according to an embodiment herein.
Figure 3B:
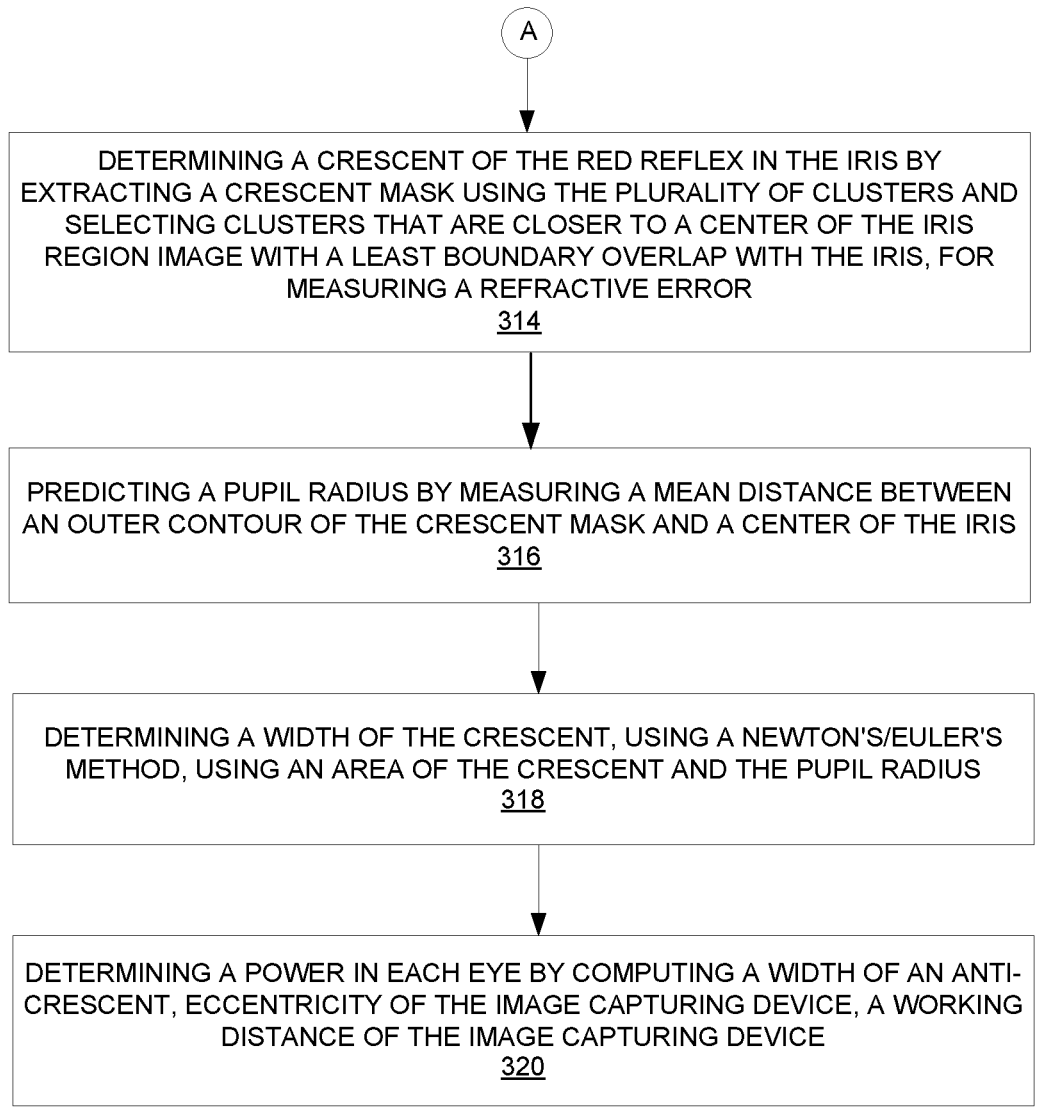

FIG. 3A and FIG. 3B are flow diagrams that illustrate a method for determining a refractive error from a red reflex image of the eyes of a subject by analyzing the red reflex image of the subject using the refractive error determination system 106 of FIG. 1 according to an embodiment herein. At step 302, a database of facial images associated with a subject is generated. In some embodiments, the facial image is captured using an image capturing device. At step 304, a probability map for each of sixteen eye landmarks on a contour of an iris of the eye by processing each eye-region image is predicted using a convolutional pose machine. At step 306, a location of an eye landmark on the eye-region image is determined as a location of a peak of the corresponding probability map. At step 308, a circular mask of the iris is determined, using a Circular Regression technique, by computing a circle of radius and a center for the sixteen eye landmarks from its respective location. At step 310, an iris region image between the circular mask of the iris and the eye-region image is extracted using a bitwise algorithm. At step 312, a plurality of clusters is generated, using a spectral clustering technique, by identifying a similarity between pixels of the iris region image. At step 314, a crescent of the red reflex in the iris is determined by extracting a crescent mask using the plurality of clusters and selecting clusters that are closer to a center of the iris region image with a least boundary overlap with the iris, for measuring a refractive error. At step 316, a pupil radius is predicted by measuring a mean distance between an outer contour of the crescent mask and a center of the iris. At step 318, a width of the crescent is determined, using a Newton's/Euler's Method, using an area of the crescent and the pupil radius. At step 320, a power in each eye is determined by computing a width of an anti-crescent, the eccentricity of the image capturing device, a working distance of the image capturing device.

In some embodiments, each eye-region image is extracted by (i) redacting the facial image by predicting a plurality of facial landmarks from the facial image; and (ii) extracting the eye region images from the redacted image by slicing the redacted image using the plurality of facial landmarks. In some embodiments, the eye region images comprise a left eye-region image and a right eye-region image. In some embodiments, a similarity matrix is generated between every pair of the pixels of the iris region based on the identified similarity between the pixels of the iris region for generating the plurality of clusters using the spectral clustering technique. In some embodiments, the width of the anti-crescent is computed by subtracting the width of the crescent from the pupil diameter.

Figure 4:
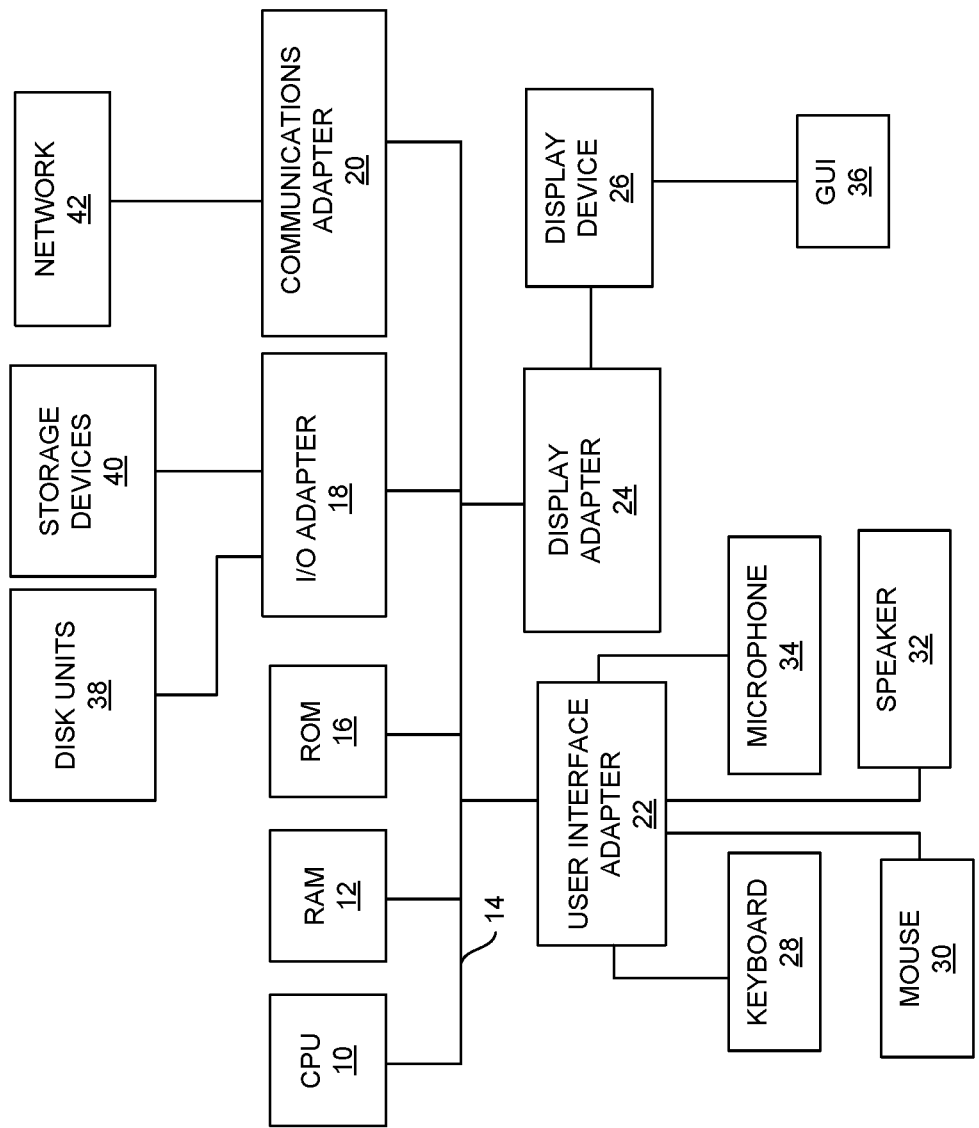
FIG. 4 is a schematic diagram of a computer architecture in accordance with the embodiments herein.

A representative hardware environment for practicing the embodiments herein is depicted in FIG. 4, with reference to FIGS. 1 through 3B. This schematic drawing illustrates a hardware configuration of a server/system/computing device in accordance with the embodiments herein. The system (e.g. the refractive error determination system 106) includes at least one processing device CPU 10 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the appended claims.

What is claimed is:

1. A method of determining a refractive error from a red reflex image of the eyes of a subject by analyzing the red reflex image of the subject using deep learning and clustering algorithms, wherein the method comprises:
   generating a database with a facial image associated with a subject, wherein the facial image is captured using an image capturing device;
   characterized in that, predicting a probability map for each of sixteen eye landmarks on a contour of an iris of the eye by processing each eye-region image using a convolutional pose machine;

automatically determining a location of an eye landmark on the eye-region image as a location of a peak of the corresponding probability map;

determining a circular mask of the iris, using a circular regression technique, by computing a circle of radius and a center for the sixteen eye landmarks from its respective location;

extracting an iris region image between the circular mask of the iris and the eye-region image using a bitwise algorithm;

generating a plurality of clusters, using a spectral clustering technique, by identifying a similarity between pixels of the iris region image;

determining a crescent of the red reflex in the iris by extracting a crescent mask using the plurality of clusters and selecting clusters that are closer to a center of the iris region image with a least boundary overlap with the iris, for measuring a refractive error;

automatically predicting a pupil radius by measuring a mean distance between an outer contour of the crescent mask and a center of the iris;

automatically determining a width of the crescent, using a Newton's/Euler's Method, using an area of the crescent and the pupil radius; and automatically determining a power in each eye by computing a width of an anti-crescent, eccentricity of the image capturing device, a working distance of the image capturing device.

2. The method as claimed in claim 1, wherein each eye-region image is extracted by:

redacting the facial image by predicting a plurality of facial landmarks from the facial image; and extracting the eye region images from the redacted image by slicing the redacted image using the plurality of facial landmarks, wherein the eye region images comprise a left eye-region image and a right eye-region image.

3. The method as claimed in claim 1, wherein the method further comprises the steps of generating a similarity matrix between every pair of the pixels of the iris region image based on the identified similarity between the pixels of the iris region image for generating the plurality of clusters using the spectral clustering technique.

4. The method as claimed in claim 1, wherein the width of the anti-crescent is computed by subtracting the width of the crescent from the pupil diameter.

5. The method as claimed in claim 2, wherein the plurality of facial landmarks is detected using a facial landmark detection technique, wherein the facial landmark detection technique comprises a machine learning model to identify frontal human faces in the facial image and estimate their pose with 50 to 200 landmarks on the face of the subject.

6. The method as claimed in claim 5, wherein the facial landmark detection technique comprises at least one of the Histogram of Ordered Gradients (HOG) feature combining with a linear classifier algorithm, an image pyramid technique, or a sliding window detection technique.

7. The method as claimed in claim 5, wherein the convolutional pose machine implements an ensemble of regression trees model, using the facial landmark detection technique, to predict a position of the plurality of facial landmarks on the facial image of the subject including points on the eyelid and canthi.

8. The method as claimed in claim 1, wherein the eccentricity of the image capturing device is defined to be a distance between the nearest edge of camera lens and a center of the flash in the image capturing device.

9. The method as claimed in claim 1, wherein the working distance is estimated using the iris and its width as a marker which is scaled by a ratio dependent on the resolution of the image capturing device.

10. The method as claimed in claim 1, wherein the facial image of the subject is preprocessed for noise removal, contrast improvements, and blur detection.

11. The method as claimed in claim 10, wherein the noise removal of the facial image is performed by smoothing the facial image using Gaussian blurring.

12. The method as claimed in claim 10, wherein the contrast improvements of the facial image include applying a gamma correction with a suitable value depending on the average pixel value.

13. The method as claimed in claim 10, wherein the blur detection in the facial image is performed using a variance of the Laplacian of Gaussian (LoG) operation.

14. One or more non-transitory computer-readable storage mediums storing instructions, which when executed by a processor, causes automatic determination of a refractive error from a red reflex image of the eyes of a subject by analyzing the red reflex image of the subject using deep learning and clustering algorithms, by performing the steps of:

generating a database with a facial image associated with a subject, wherein the facial image is captured using an image capturing device;

characterized in that, predicting a probability map for each of sixteen eye landmarks on a contour of an iris of the eye by processing each eye-region image using a convolutional pose machine;

automatically determining a location of an eye landmark on the eye-region image as a location of a peak of the corresponding probability map;

determining a circular mask of the iris, using a circular regression technique, by computing a circle of radius and a center for the sixteen eye landmarks from its respective location;

extracting an iris region image between the circular mask of the iris and the eye-region image using a bitwise algorithm;

generating a plurality of clusters, using a spectral clustering technique, by identifying a similarity between pixels of the iris region image;

determining a crescent of the red reflex in the iris by extracting a crescent mask using the plurality of clusters and selecting clusters that are closer to a center of the iris region image with a least boundary overlap with the iris, for measuring a refractive error;

automatically predicting a pupil radius by measuring a mean distance between an outer contour of the crescent mask and a center of the iris;

automatically determining a width of the crescent, using a Newton's/Euler's Method, using an area of the crescent and the pupil radius; and automatically determining a power in each eye by computing a width of an anti-crescent, eccentricity of the image capturing device, a working distance of the image capturing device.

15. The one or more non-transitory computer-readable storage mediums storing instructions as claimed in claim 14, wherein each eye-region image is extracted by:

redacting the facial image by predicting a plurality of facial landmarks from the facial image; and extracting the eye region images from the redacted image by slicing the redacted image using the plurality of facial landmarks, wherein the eye region images comprise a left eye-region image and a right eye-region image.

16. The one or more non-transitory computer-readable storage mediums storing instructions as claimed in claim 14, further causes automatic generation of a similarity matrix between every pair of the pixels of the iris region image based on the identified similarity between the pixels of the iris region image for generating the plurality of clusters using the spectral clustering technique.

17. A system for determining a refractive error from a red reflex image of the eyes of a subject by analyzing the red reflex image of the subject using deep learning and clustering algorithms, the system comprising:

a memory that stores a database and a set of modules;

a device processor that executes said set of modules, wherein said set of modules comprise:

a database generation module that generates a database with facial images associated with a subject, wherein the facial image is captured using an image capturing device;

characterized in that, a probability map prediction module that predicts a probability map for each of sixteen eye landmarks on a contour of an iris of the eye by processing each eye-region image using a convolutional pose machine;

a eye landmark location determination module that determines a location of an eye landmark on the eye-region image as a location of a peak of the corresponding probability map;

a circular mask determination module that determines a circular mask of the iris, using a circular regression technique, by computing a circle of radius and a center for the sixteen eye landmarks from its respective location;

an iris region extraction module that extracts an iris region image between the circular mask of the iris and the eye-region image using a bitwise algorithm;

a cluster generation module that generates a plurality of clusters, using a spectral clustering technique, by identifying a similarity between pixels of the iris region image;

a crescent determination module that determines a crescent of the red reflex in the iris by extracting a crescent mask using the plurality of clusters and selecting clusters that are closer to a center of the iris region image with a least boundary overlap with the iris, for measuring a refractive error;

a pupil prediction module that predicts a pupil radius by measuring a mean distance between an outer contour of the crescent mask and a center of the iris;

a crescent width determination module that determines a width of the crescent, using a Newton's/Euler's Method, using an area of the crescent and the pupil radius; and a power determination module that determines a power in each eye by computing a width of an anti-crescent, eccentricity of the image capturing device, a working distance of the image capturing device.

18. The system as claimed in claim 17, wherein the system extracts each eye-region image by:

redacting the facial image by predicting a plurality of facial landmarks from the facial image; and extracting the eye region images from the redacted image by slicing the redacted image using the plurality of facial landmarks, wherein the eye region images comprise a left eye-region image and a right eye-region image.

19. The system as claimed in claim 17, wherein the cluster generation module generates a similarity matrix between every pair of the pixels of the iris region image based on the identified similarity between the pixels of the iris region image for generating the plurality of clusters using the spectral clustering technique.

* * * * *